Patented Sept. 24, 1935

2,015,073

UNITED STATES PATENT OFFICE 2,015,073

PROCESS OF HYDRATING OLEFINES

George Frederick Horsley, Norton-on-Tees, England, assignor to Imperial Chemical Industries Limited, a corporation of Great Britain No Drawing. Application September 26, 1933, Serial No. 691,078. In Great Britain October 5, 1932

4 Claims. (Cl. 260—156)

This invention relates to hydrating and dehydrating reactions such for example as the production of alcohols by hydration of olefines or the corresponding reverse dehydrating reactions.

The principal object of the present invention is to provide new and improved catalysts for hydrating reactions of the kind described, but I have found it convenient to test the activity of catalysts for such reactions by determining their activity for the corresponding reverse reaction. It is apparent from theoretical considerations that for a reversible reaction the measure of the activities of catalysts for one reaction is proportional to the measure of their activities for the reverse reaction.

In the case of ethylene hydration it has already been proposed to employ a catalyst consisting of or comprising a phosphate of cadmium, beryllium, zinc, aluminium, tin or lead. It has also been proposed to prepare alcohols by combining olefines with water in the vapour state at a temperature of at least 100° C. and in the presence of a metal of the platinum group or gold, silver, copper, iron, cobalt, nickel, molybdenum or manganese, of salts thereof, in particular salts of weak inorganic acids, copper phosphate being specified as a suitable catalyst.

I have now found that particularly suitable catalysts for reactions of the kind described consist of or comprise a phosphate of a divalent metal associated with a phosphate of a trivalent metal. The divalent metal may be for example magnesium, cadmium or an alkaline earth metal or iron, copper or nickel in the divalent state. The trivalent metal may be for example aluminium or chromium or iron in the trivalent state. Thus a mixture of ferric and cupric phosphate is a suitable catalyst for the hydration of ethylene, and a mixture of ferric phosphate with barium, strontium or ferrous phosphate is also suitable.

According to one form of the present invention in the catalytic hydration of gases such as unsaturated hydrocarbons, a catalyst is employed consisting of or comprising one molecular proportion of a metaphosphate of a divalent metal $(M^{II}(PO_3)_2)$ associated with two molecular proportions of a metaphosphate of a trivalent metal $(M^{III}(PO_3)_3)$. Such catalysts may be prepared in any suitable manner, e. g. by dissolving the metals or their oxides or suitable salts in phosphoric acid, evaporating the solution and drying the solid product at a temperature not exceeding 300° C.

The reactions are preferably carried out in the vapour phase and at a raised temperature. The dehydration reactions may suitably be effected at atmospheric pressure but it is preferred to conduct the hydration reactions under an increased pressure say of 100 atmospheres or over. For this latter type of reaction and when working in the vapour phase it is preferred to employ a considerable deficiency of steam, the gaseous reaction products being cooled to separate an aqueous solution of the desired product and the surplus gaseous reactant being circulated.

The following examples illustrate the production of ethylene by dehydration of ethyl alcohol and the production of ethyl alcohol by hydration of ethylene.

Example 1

A catalyst was prepared by heating 1 molecular proportion of ferrous oxalate $(FeC_2O_4.2H_2O)$ with 1 molecular proportion of ferric oxide and an aqueous solution containing 8 molecular proportions of phosphoric acid, the mixture being evaporated to dryness and the solid product dried at a temperature not exceeding 300° C. Ethyl alcohol was vaporized at the rate of 24 ccs. per hour and the vapour passed over the catalyst at a temperature of 250° C. and at atmospheric pressure. The weight of the catalyst employed was 44 grams and the bulk volume was 100 ccs. The gaseous reaction products were cooled to condense water and unchanged ethyl alcohol and substantially pure ethylene remained amounting to a yield of 98.5 per cent. of the ethyl alcohol employed.

Example 2

The experiment described in the previous example was repeated employing a catalyst prepared by heating one molecular proportion of barium carbonate with one molecular proportion of ferric oxide and an aqueous solution containing 8 molecular proportions of phosphoric acid, the mixture being evaporated to dryness and the solid product dried at a temperature not exceeding 300° C. The weight of the catalyst employed was however 48 grams. Substantially pure ethylene was produced amounting to a yield of 85.6 per cent. of the alcohol employed.

Example 3

A catalyst was prepared as in the preceding examples from 1 molecular proportion of cupric oxide, 1 molecular proportion of ferric oxide and 8 molecular proportions of phosphoric acid. Ethyl alcohol was vaporized at the rate of 20 cc. per hour and the vapor passed over 124 grams of catalyst at a temperature of 200° C. and at atmospheric pressure. The gaseous reaction products were cooled to condense water therefrom. Substantially pure ethylene was produced amounting to a yield of 96.0 per cent. of the alcohol employed.

*Example 4*

A catalyst was prepared as described in Example 3. A mixture of ethylene and steam was passed over this catalyst under a total pressure of 100 atmospheres, the partial pressure of the steam being 30 atmospheres and the partial pressure of the ethylene 70 atmospheres. The catalyst was maintained at a temperature of 290° C. and the reaction gases were passed over the catalyst at the rate of 6000 volumes of gas (calculated at atmospheric pressure and 20° C.) per hour per unit volume of catalyst space. The product comprised 278 grams of ethyl alcohol per hour per litre of catalyst and the yield of alcohol on the ethylene used up was 95 per cent. with a conversion of ethylene per passage of 3.46 per cent.

A very good catalyst may also be prepared by heating one molecular proportion of strontium carbonate with two atomic proportions of aluminum and 8 molecular proportions of phosphoric acid, the mixture being evaporated to dryness and the solid product dried at a temperature not exceeding 300° C.

I claim:—

1. A process for the catalytic hydration of unsaturated hydrocarbons in which a catalyst is employed comprising essentially a metaphosphate of a divalent metal associated with the metaphosphate of a trivalent metal in the ratio of one molecular proportion of divalent phosphate to one to two molecular proportions of trivalent phosphate.

2. A process for the catalytic hydration of ethylene which comprises the step of passing a mixture of steam and ethylene at a total pressure of 100 atmospheres and a temperature of 290° C. in contact with the catalyst comprising essentially ferrous phosphate associated with ferric phosphate.

3. A process for the catalytic hydration of unsaturated hydrocarbons which comprises the step of passing a mixture of steam and the unsaturated hydrocarbon at a pressure of at least 100 atmospheres and a temperature of at least 100° C. in contact with a catalyst comprising essentially barium phosphate associated with ferric phosphate.

4. A process for the catalytic hydration of unsaturated hydrocarbons which comprises the step of passing a mixture of steam and the unsaturated hydrocarbon at a pressure of at least 100 atmospheres and a temperature of at least 100° C. in contact with a catalyst comprising essentially strontium phosphate associated with aluminum phosphate.

GEORGE FREDERICK HORSLEY.